United States Patent
Barile

(10) Patent No.: US 6,560,621 B2
(45) Date of Patent: May 6, 2003

(54) WORLD WIDE WEB FORMATTING FOR PROGRAM OUTPUT THROUGH PRINT FUNCTION

(75) Inventor: Steven E. Barile, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/998,616

(22) Filed: Dec. 29, 1997

(65) Prior Publication Data

US 2001/0054047 A1 Dec. 20, 2001

(51) Int. Cl.[7] .............................................. G06F 17/30
(52) U.S. Cl. ....................................... 707/513; 707/526
(58) Field of Search ................................ 707/513, 526, 707/500, 527; 345/332, 352, 507; 709/200–205, 217, 301; 364/479.05; 395/106, 834, 825; 358/400, 403, 462

(56) References Cited

U.S. PATENT DOCUMENTS

| | | | | |
|---|---|---|---|---|
| 5,692,111 A | * | 11/1997 | Marbry et al. ............. | 358/1.15 |
| 5,727,135 A | * | 3/1998 | Webb et al. ................ | 358/1.14 |
| 5,768,516 A | * | 6/1998 | Sugishma ................... | 709/217 |
| 5,933,144 A | * | 8/1999 | Alcorn ........................ | 345/347 |
| 5,963,216 A | * | 10/1999 | Chiarabini et al. ......... | 345/439 |
| 5,982,996 A | * | 11/1999 | Snyders ..................... | 358/1.15 |
| 6,029,182 A | * | 2/2000 | Nehab et al. ............... | 707/523 |
| 6,035,323 A | * | 3/2000 | Narayen et al. ............ | 709/201 |
| 6,061,700 A | * | 5/2000 | Brobst et al. ............... | 707/517 |
| 6,295,530 B1 | * | 9/2001 | Ritchie et al. ................. | 707/4 |
| 6,330,611 B1 | * | 12/2001 | Itoh et al. ................... | 709/229 |

OTHER PUBLICATIONS

WinFax PRO Version 8.0 User's Guide, Symantec Corporation, pp. i–vi, 1–1 to 1–8, 2–1 t–2–9, 3–21, 4–1 to 4–16, B–3, and B–14 to B–17 (1997).
Quick Profile—Winfax Pro 8.0, Symantec Corporation, 2 pages (Announce Date: Feb. 24, 1997).
Symantec Announces WinFax PRO 8.0, Symantec Corporation, 5 pages (Feb. 24, 1997).
Oliver et al., Netscape2 Unleashed, Sams net, pp. 352–353, Feb. 1996.*

* cited by examiner

*Primary Examiner*—Alford W. Kindred
(74) *Attorney, Agent, or Firm*—Blakely, Sokoloff, Taylor & Zafman LLP

(57) ABSTRACT

A method of creating a Web page comprising the steps of: (a) using an application to create a file not formatted for Web viewing referred to as a source file; and (b) transmitting said source file to a print driver program, said print driver program formatting said source file in a Web format by adding and/or replacing portions of said source file with Web format commands/codes. The method wherein said Web formatted source file is stored in a location accessible by World Wide Web browsers.

34 Claims, 4 Drawing Sheets

WORLD WIDE WEB FORMATTING FOR PROGRAM OUTPUT THROUGH PRINT FUNCTION

BACKGROUND OF THE INVENTION

1. Field of the Invention

The present invention relates generally to the creation of files in a format capable of being utilized by a Web browser and, more particularly, to a method and apparatus for creating Web browser readable files by printing through the Microsoft print driver mechanism.

2. Description of the Related Art

The Internet is a network of computers and computer networks located both domestically and throughout the world. Generally, the World Wide Web ("the Web") is a collection of files available across the Internet that conform to standards designed to facilitate display, location and retrieval of information ("content") available on the Internet, typically though not necessarily, through a graphical user interface (GUI). Computer programs that read and display information stored in files in recognized formats are referred to as "Web browsers." Web browsers are manufactured by a number of companies including Netscape and Microsoft. Although the term "server" has more than one meaning in the World Wide Web context, a "server" is a computer connected to the Internet on which Web formatted content may be stored.

There are a large number of Web standards for information storage and retrieval. Some of these standards include Hypertext Markup Language ("HTML"), Dynamic HTML (DHTML), Virtual Reality Modeling Language (VRML), Graphic Interface Format (GIF), and Joint Photographers Expert Group (JPEG) among others. Of these, HTML is currently the most widely adopted format. Thus, by using a Web browser a user is able to retrieve and display information stored in HTML format. Such information may be stored on virtually any computer or computer network connected to the Internet, and the information itself may be varied in form, i.e., text, a picture, sound, video, etc. Files/documents stored in a Web format are often referred to as "Web pages" because each file/document typically appears as a separate screen/page when viewed by a browser.

There are several different versions of HTML. However, each version of HTML utilizes hypertext concepts to facilitate information location, retrieval, and display. Hypertext is the concept of displaying information that is linked to other information about which the user may be interested. Thus, a user may select an item of information (e.g., the word "giraffe"), and additional information about which the user may be interested will be displayed (e.g., links to zoos in the area, information about giraffe anatomy, etc.). Files/documents stored in HTML format are not compiled. Rather, they are interpreted by Web browsers as they are read.

HTML facilitates display and retrieval of information by Web browsers through he use of a number of standard codes/instructions that indicate how information is to be isplayed, where it may be found, and what action to take in response to user selections or activity. Although plain text in an HTML document is often simply displayed, just some of the codes/instructions supported by HTML include: <BANNER>, <BASE>, <BGSOUND>, <BODY>, <BODYTEXT>, <DIV>, <FN>, <HEAD>, <HTML>, <ISINDEX>, <LANG>, <LINK>, <META>, <NEXTID>, <RANGE>, <SPOT>, <STYLE>, <H>, <TITLE>, <A>, <ABBREV>, <ADDRESS>, <AU>, <BQ>, <BR>, <CENTER>, <CREDIT>, <DEL>, <HR>, <INS>, <MARQUEE>, <NOBR>, <NOTE>, <PERSON>, <Q>, <TAB>, <WBR>, <AREA>, <IMG>, <MAP>, <FORM>, <INPUT>, <OPTION>, <SELECT>, <TEXTAREA>, <P>, <DD>, <DIR>, <DL>, and <DT>. In addition, there are at least fifty-seven (57) other codes supported by various versions of HTML. VRML and other script languages are similarly complex while JPEG, GIF and other graphics file types have intricate structures that are generally inaccessible at the user level.

Typically, Web pages are created in one of two ways. First, a programmer or other person may create a Web page by typing the appropriate codes and text into a file. This process can be very time consuming and requires a detailed knowledge of HTML or other Web formats. In addition, the programmer or other person will need to be familiar with programming concepts generally and have a detailed knowledge of computer operations to successfully author a Web page and place it in a proper location so that it is available to others using the Internet. Thus, the Web page author will need to have a detailed knowledge of a series of applications and their commands (e.g., file transfer protocol (FTP), etc.) to successfully create and post a Web page.

A second method of creating a Web page utilizes Web authoring tools (e.g., Visual Cafe, Hot Dog, Front Page). These tools are separate computer programs designed to automate portions of Web page design. For example, the complex series of commands employed by HTML or another Web format may be replaced by a more structured authoring method and/or graph based authoring methods. However, these programs still require a high degree of skill, and use of the Web authoring tool may require time consuming training or detailed study.

Over the last several years, the Internet and the World Wide Web specifically have become increasingly popular and growing numbers of less computer knowledgeable/skilled people are using the Internet and Web. The complexity and time intensive nature of Web page authoring is a barrier preventing these persons from creating their own Web pages ("a home page"). Thus, there has developed a need for a is simpler method of creating Web pages. In addition, because of the complexity and time intensive nature of HTML and other Web formats themselves, there is a general need for simpler methods of creating Web pages, even by sophisticated computer users/programmers.

SUMMARY OF THE INVENTION

A method of creating a Web page comprising the steps of creating a source file having a format not suited for viewing on the World Wide Web. Transmitting said source file to a print driver program through the Microsoft print driver mechanism. Formatting said source file in a format suited for viewing on the World Wide Web.

DESCRIPTION OF ILLUSTRATIVE EMBODIMENTS

GDI, The UPD, and the Registry

1. Graphics Device Interface (GDI)

Various versions of Microsoft Windows (including Windows 1.0—Windows NT) offer a series of functions that provide abstraction from the underlying hardware when displaying or printing text/graphics. Using these functions, a programmer is generally able to develop software capable of writing to a wide variety of hardware devices without including specialized statements that may only be operable on a particular hardware device. The group of functions that provide this abstraction capability in Microsoft Windows for graphics or text devices is referred to as the Graphics Device Interface (GDI). The GDI contains hundreds of functions and data structures. Thus, a computer program that prints or displays graphics or text may include a series of generalized statements that call GDI functions, and the GDI functions (in combination with other software) provide support for a wide variety of specific hardware devices and their associated characteristics (e.g., screen height/width, paper length/width, supported fonts, supported colors, raster/vector, etc.).

Figure 1:
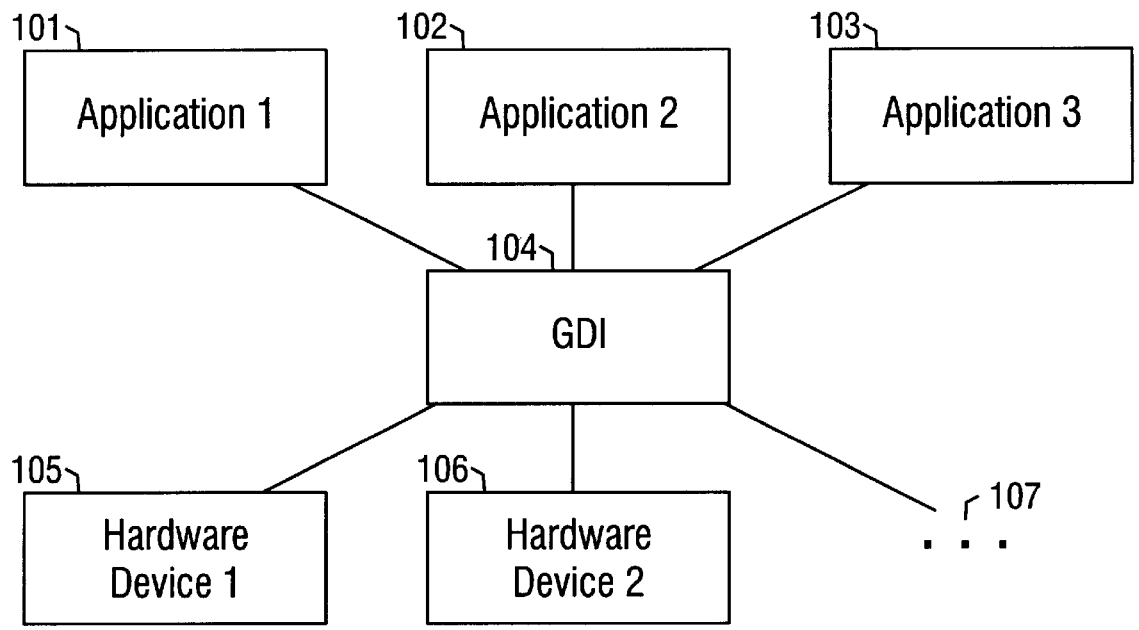
FIG. 1 is a block diagram showing applications making GDI calls which are then passed on to hardware devices.

As shown generally in FIG. 1, GDI functions typically receive information from the calling program that is then modified for presentation on the selected device according to its characteristics. Once modification of the passed information is complete, the modified information is then passed by the GDI to the hardware device through other parts of the operating/printing system (e.g., a print spooler).

The particular characteristics of a hardware device are typically stored in separate files that end with the extension ".DRV," while the GDI functions are grouped in a dynamic link library (DLL). Thus, in operation, a program issues a call to a GDI function, which modifies the passed information according to the device characteristics stored in the associated DRV file before passing the modified information to other parts of the operating system. The GDI and its characteristics are more fully described in widely available publications describing Windows features including Charles Petzold, Programming Windows95 (4th ed., 1996, ISBN 1-55615-676-6).

2. The Universal Print Driver/DRV Files

Figure 2:
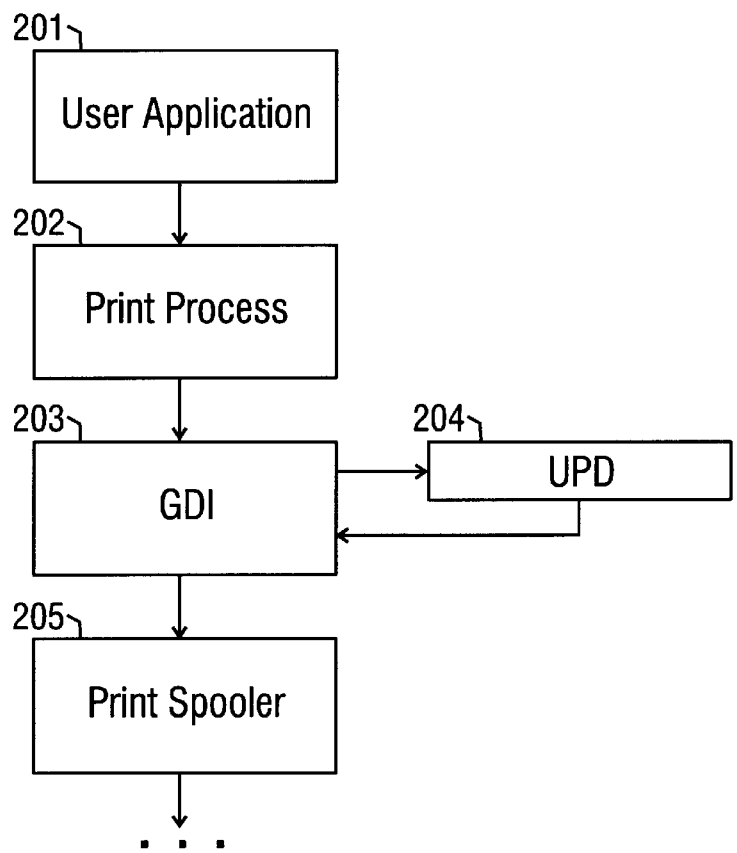
FIGS. 2 and 3 are block diagrams of print operations from within applications.
Figure 3:
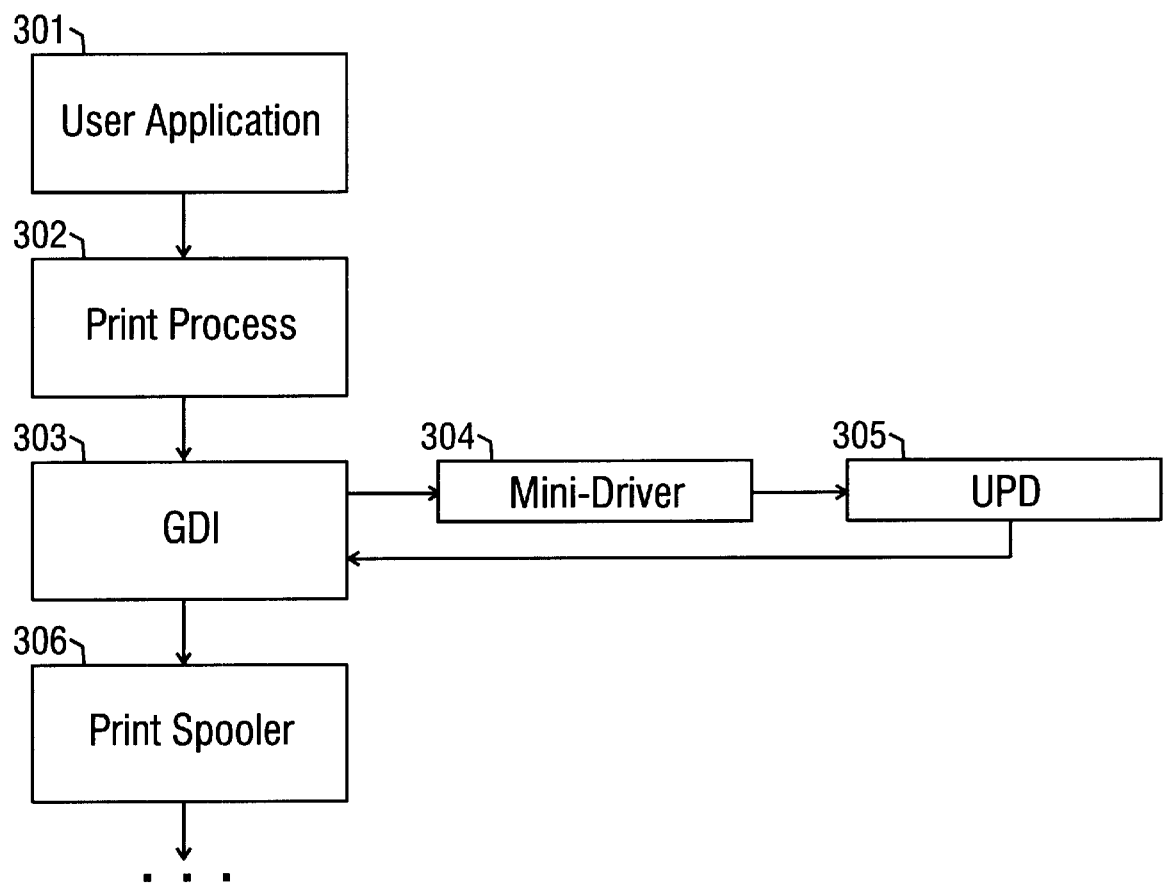

Various versions of Microsoft Windows (including Windows95) provide a standard print driver intended to accept calls from and/or return data to the GDI. This standard print driver is referred to as the Universal Print Driver (UPD). As shown in FIG. 2, in operation, a program attempting to display or print information issues a series of calls to the GDI. The GDI then issues a series of calls to perform functions or pass data to the print driver which is typically the UPD. FIG. 3 shows that prior to receipt by the UPD, a mini-driver may further retrieve information or issue calls to device specific information stored in DRV files, and then pass the modified information on to the UPD. Upon completion of the UPD functions, control and data may be returned to the GDI, which passes the modified information along for final display or printing. Because the UPD supports standard requests from the GDI, a print driver developer typically need only supply device specific information in a form usable by the UPD in order to support a new hardware device.

In the alternative to working with the UPD, a print driver developer may create a completely new print driver as a substitute for the UPD. By implementing a custom print driver, GDI calls may be processed in any fashion specified by the print driver developer. Print drivers are typically, though not necessarily, stored as DRV files.

In one embodiment of the invention, the UPD is replaced by a custom print driver that accepts calls from the GDI, formats GDI passed data in a Web format, and then stores the formatted data in a World Wide Web accessible location. A description of the major steps and features of print driver development follows. Though development of a print driver involves a large number of choices by the programmer and may be time-intensive, such development is routine for one of ordinary skill in the art. The print driver developer may be further assisted by the large number of reference works describing print driver development including the Microsoft Windows95 Driver Developers Kit (DDK) (which is incorporated in its entirety herein) and its associated documentation which further includes a model print driver for a Hewlett-Packard LaserJet printer.

3. The Windows Registry

Of further interest to a print driver developer is the Windows Registry which is forms part of the Microsoft Windows95 and WindowsNT operating systems (earlier versions of Windows provided similar functionality through ".INI" files). The Windows Registry contains configuration information about, inter alia, the operating system, the user, and hardware and software settings. The Registry acts as a central repository of configuration information which may be utilized by applications to provide a consistent, configurable environment to the user.

Figure 4:
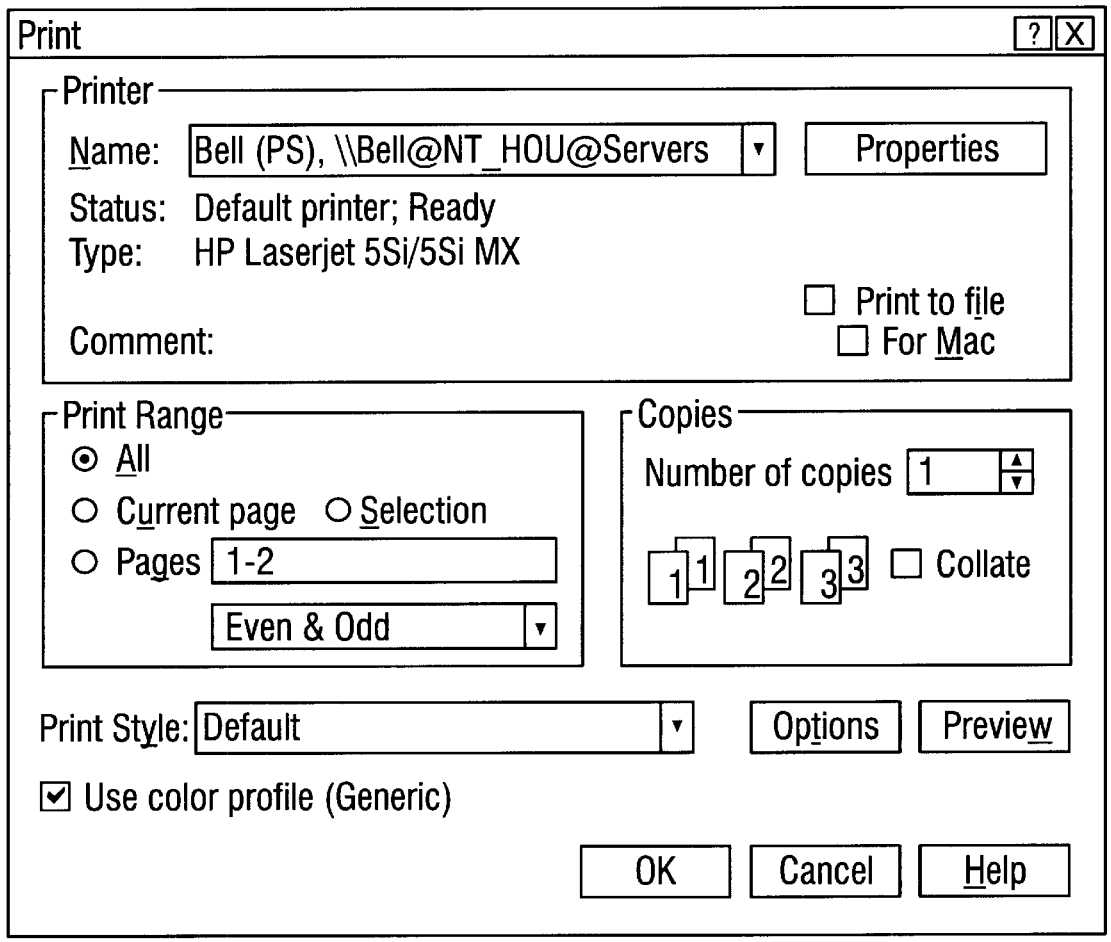
FIG. 4 shows a standard Windows print dialog box.

Of particular relevance to the present application is the printer configuration information stored in the Registry. When appropriate entries are made to the Registry under the HKEY_CURRENT_CONFIG heading, printers and printer drivers are defined to the operating system. Printer definition entries made to the Registry affect the available printers and print drivers selectable from the standard print dialog box displayed by applications complying with Windows interface standards. A standard print dialog box is depicted in FIG. 4 with an HP LaserJet printer selected. Thus, a printer or print driver entered in the Registry may be selected from any application that utilizes the standard print dialog box. The Windows Registry is further described in a variety of widely available reference works including Peter Norton & John Meuller, Peter Norton's Complete Guide to Windows95 (2nd ed., 1997 ISBN 0-672-31040-6), which is incorporated in its entirety herein by reference.

By performing appropriate modification to the Registry, a print driver developer may cause a print driver to appear in the standard print dialog box and to be executed when selected by the user from within any application that utilizes the standard print dialog box and the Registry. Thus, in one embodiment of the invention, a custom print driver is added to the Registry (typically, though not necessarily, by a separate install application). Thereafter, the print driver will appear as a selectable printer from within any application that utilizes the standard print dialog box. When the print driver is selected by a user, the print driver is executed and print output from the application (in the form of GDI calls) is directed to the print driver.

A Print Driver in Accordance with the Present Invention

Figure 5:
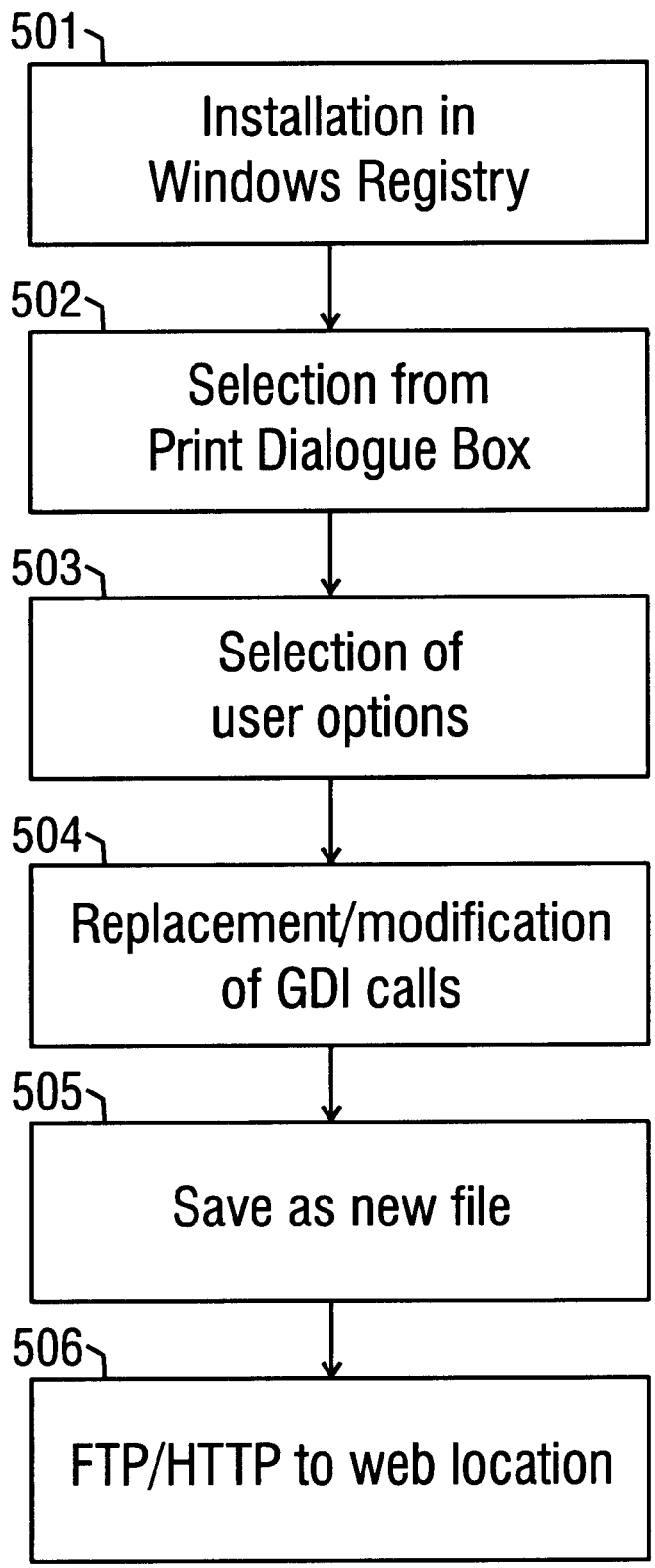
FIG. 5 is a flowchart of printing to a custom driver.

In one embodiment of the present invention, a print driver accepts output from any application (in the form of GDI calls) and inserts HTML or other Web format coding. An overview of the print driver process is shown in FIG. 5. The print driver is added to the Windows Registry (as described above) and may then be selected by a user from within any application utilizing the standard print dialog box. As part of the install procedure and/or when executed from an application, the user may be prompted for additional information to configure the print driver process. For example, the user may be prompted to select the desired Web format (e.g., HTML, VRML, JPEG, GIF, etc.), to enter a file name in which Web formatted output is saved, to enter a location at which the Web formatted output is saved, and/or to select Web page setup features (e.g., portrait, landscape).

When executed, the print driver interprets and/or replaces GDI calls from the user application with appropriate Web format commands/coding and saves the modified output as a new Web formatted file. For example, when HTML coding is selected, a GDI StartDoc call from a user application creates a blank HTML file using a file name specified by the user or otherwise generated. A GDI SelectObject call loads a device context (DC) structure pointing to a handle to a palette, font, brush, etc. that may then be utilized in creating the HTML formatted file. A GDI ExtTextOut call provides text to appear as part of the Web page being created. A GDI BitBlt call provides a bitmap and x and y co-ordinates to position a graphic on the Web page. The graphic is converted by the custom print driver to any of a variety of graphics file formats (e.g., GIF, JPEG, BMP, TIFF, PCX, etc.), and assigned a separate file name so that it may be referred to by HTML commands/codes.

A GDI EndDoc call causes the print driver to save the Web formatted information as a file with a name specified by the user or otherwise generated. Once saved, the print driver may then place the file in a Web accessible location by utilizing file transport protocol (FTP), Hypertext Transport Protocol (HTTP) or other means. A link to the newly created Web formatted file may be placed in a location easily accessible by the user and the Web formatted file may then be viewed by a user using a Web browser.

In addition to the above GDI functions, other GDI functions may be similarly modified/replaced by appropriate HTML codes and/or functions and the above GDI functions may be handled in a different fashion depending on the desired functionality and the target Web format.

As part of the print driver installation and/or during the print process itself, the user may be prompted to provide information regarding the user's Internet service provider (ISP) and/or select an ISP from a list of ISPs. The print driver may maintain a dynamic list of ISPs by downloading such a list from a database of ISPs and their properties stored anywhere on the Internet or in some other accessible location. Further, the ISP list may be maintained using Common Gateway Interface (CGI) forms accessible by the ISPs themselves, an administrator, or administration application.

Using a print driver as described herein, from within any application which issues GDI calls, a user may select printing to the Web print driver and thus create a Web formatted file without mastering additional software, HTML, or other Web formats.

It will be appreciated by those of ordinary skill in the art relevant hereto having to the benefit of this disclosure that the illustrative embodiments described above are capable of numerous variations without departing from the scope and spirit of the invention. The methods may be performed by a computer program or computer programs executed by any of a wide variety of computers and may exist in source code, object code, script, machine language, loadable or embedded forms. In addition, while the is sequence of acts are presented in a specific order, the order of the acts may be modified unless otherwise indicated.

Accordingly, the exclusive rights sought herein are as described in the claims below.

What is claimed is:

1. A method comprising:
   enabling a user to select World Wide Web formatting for an output of a program through a print function, wherein the output of the program has a format not suited for viewing on the World Wide Web; and
   formatting the output of the program for viewing on the World Wide Web in response to the selection for World Wide Web formatting.

2. The method of claim 1, wherein the enabling comprises entering a World Wide Web format driver in an operating system registry.

3. The method of claim 1, wherein the enabling comprises enabling a display of a print dialog box prompting the user to select a World Wide Web format driver.

4. The method of claim 1, wherein the formatting comprises formatting the output of the program in a hypertext markup language.

5. The method of claim 1, wherein the formatting comprises formatting the output of the program in accordance with graphics device interface calls from the program.

6. The method of claim 1, wherein the formatting comprises formatting a source file created with the program with a World Wide Web format driver.

7. The method of claim 1, comprising transmitting the World Wide Web formatted output to a location accessible by a World Wide Web browser.

8. The method of claim 7, wherein the transmitting comprises transmitting the World Wide Web formatted output to the location using a file transfer protocol or a hypertext transport protocol.

9. A method comprising:
   receiving source data through a graphics device interface, wherein the source data has a format not suited for viewing on the World Wide Web;
   formatting the received source data for viewing on the World Wide Web using a format driver in an operating system registry; and
   transmitting the World Wide Web formatted source data to a location accessible by a World Wide Web browser.

10. The method of claim 9, wherein the formatting comprises formatting the received source data in a hypertext markup language.

11. The method of claim 9, wherein the transmitting comprises transmitting the World Wide Web formatted source data to the location using a file transfer protocol or a hypertext transport protocol.

12. A program storage device readable by a computing device, the program storage device encoding statements executable by a computer, the statements defining a method comprising:
   enabling a user to select World Wide Web formatting for an output of a program through a print function, wherein the output of the program has a format not suited for viewing on the World Wide Web; and
   formatting the output of the program for viewing on the World Wide Web in response to the selection for World Wide Web formatting.

13. The program storage device of claim 12, wherein the enabling comprises entering a World Wide Web format driver in an operating system registry.

14. The program storage device of claim 12, wherein the enabling comprises enabling a display of a print dialog box prompting the user to select a World Wide Web format driver.

15. The program storage device of claim 12, wherein the formatting comprises formatting the output of the program in a hypertext markup language.

16. The program storage device of claim 12, wherein the formatting comprises formatting the output of the program in accordance with graphics device interface calls from the program.

17. The program storage device of claim 12, wherein the formatting comprises formatting a source file created with the program with a World Wide Web format driver.

18. The program storage device of claim 12, wherein the method comprises transmitting the World Wide Web formatted output to a location accessible by a World Wide Web browser.

19. The program storage device of claim 18, wherein the transmitting comprises transmitting the World Wide Web formatted output to the location using a file transfer protocol or a hypertext transport protocol.

20. A program storage device readable by a computing device, the program storage device encoding statements executable by a computer, the statements defining a method comprising:

receiving source data through a graphics device interface, wherein the source data has a format not suited for viewing on the World Wide Web;

formatting the received source data for viewing on the World Wide Web using a format driver in an operating system registry; and transmitting the World Wide Web formatted source data to a location accessible by a World Wide Web browser.

21. The program storage device of claim 20, wherein the formatting comprises formatting the received source data in a hypertext markup language.

22. The program storage device of claim 20, wherein the transmitting comprises transmitting the World Wide Web formatted source data to the location using a file transfer protocol or a hypertext transport protocol.

23. A method comprising:

enabling a user to select World Wide Web formatting for an output of a program through a print function, wherein the output of the program has a format not suited for viewing on the World Wide Web;

receiving the output of the program through a graphics device interface; and formatting the output of the program for viewing on the World Wide Web, wherein the formatting comprises formatting the output of the program with a World Wide Web format driver in accordance with graphics device calls from the program to the graphics device interface.

24. The method of claim 23, wherein the enabling comprises entering the World Wide Web format driver in an operating system registry.

25. The method of claim 23, wherein the enabling comprises enabling a display of a print dialog box prompting the user to select the World Wide Web format driver.

26. The method of claim 23, wherein the formatting comprises formatting the output of the program in a hypertext markup language.

27. The method of claim 23, comprising transmitting the World Wide Web formatted output to a location accessible by a World Wide Web browser.

28. The method of claim 27, wherein the transmitting comprises transmitting the World Wide Web formatted output to the location using a file transfer protocol or a hypertext transport protocol.

29. A program storage device readable by a computing device, the program storage device encoding statements executable by a computer, the statements defining a method comprising:

enabling a user to select World Wide Web formatting for an output of a program through a print function, wherein the output of the program has a format not suited for viewing on the World Wide Web;

receiving the output of the program through a graphics device interface; and formatting the output of the program for viewing on the World Wide Web, wherein the formatting comprises formatting the output of the program with a World Wide Web format driver in accordance with graphics device calls from the program to the graphics device interface.

30. The program storage device of claim 29, wherein the enabling comprises entering the World Wide Web format driver in an operating system registry.

31. The program storage device of claim 29, wherein the enabling comprises enabling a display of a print dialog box prompting the user to select the World Wide Web format driver.

32. The program storage device of claim 29, wherein the formatting comprises formatting the output of the program in a hypertext markup language.

33. The program storage device of claim 29, wherein the method comprises transmitting the World Wide Web formatted output to a location accessible by a World Wide Web browser.

34. The program storage device of claim 33, wherein the transmitting comprises transmitting the World Wide Web formatted output to the location using a file transfer protocol or a hypertext transport protocol.

* * * * *

UNITED STATES PATENT AND TRADEMARK OFFICE
CERTIFICATE OF CORRECTION

PATENT NO.     : 6,560,621 B2
DATED          : May 6, 2003
INVENTOR(S)    : Barile It is certified that error appears in the above-identified patent and that said Letters Patent is hereby corrected as shown below:

<u>Column 4,</u>
Line 18, after "which", delete "is".

<u>Column 5,</u>
Line 52, after "having", delete "to".
Line 59, after "while the", delete "is".

Signed and Sealed this

Sixth Day of January, 2004

JAMES E. ROGAN
*Director of the United States Patent and Trademark Office*